United States Patent [19]

Horn

[11] Patent Number: 4,607,325

[45] Date of Patent: Aug. 19, 1986

[54] DISCONTINUOUS OPTIMIZATION PROCEDURE MODELLING THE RUN-IDLE STATUS OF PLURAL PROCESS COMPONENTS

[75] Inventor: Brian C. Horn, Phoenix, Ariz.

[73] Assignee: Honeywell Inc., Phoenix, Ariz.

[21] Appl. No.: 595,117

[22] Filed: Mar. 30, 1984

Related U.S. Application Data

[63] Continuation-in-part of Ser. No. 313,429, Oct. 21, 1981, abandoned.

[51] Int. Cl.$^4$ .................................................. G05B 13/04
[52] U.S. Cl. ....................................... 364/151; 364/150; 364/153; 364/156; 364/180; 364/494; 364/495
[58] Field of Search ................................. 364/149–153, 364/156, 166, 180, 493–495; 318/561

[56] References Cited

U.S. PATENT DOCUMENTS

| | | | |
|---|---|---|---|
| 3,683,161 | 8/1972 | Stadlin et al. | 364/493 |
| 3,891,836 | 6/1975 | Lee | 364/151 |
| 3,913,829 | 10/1975 | Fink | 364/493 |
| 3,925,645 | 12/1975 | Stern | 364/180 |
| 3,932,735 | 1/1976 | Giras | 364/156 |
| 4,027,145 | 5/1977 | McDonald et al. | 364/494 |
| 4,069,675 | 1/1978 | Adler et al. | 364/156 |
| 4,288,854 | 9/1981 | Burroughs | 364/180 |
| 4,403,293 | 9/1983 | Bradt et al. | 364/156 |

OTHER PUBLICATIONS

"How to Use Mixed-Integer Programming", D. H. Allen, *Chemical Engineering*, Mar. 29, 1976, pp. 114–120.

Primary Examiner—Jerry Smith
Assistant Examiner—John R. Lastova
Attorney, Agent, or Firm—A. A. Sapelli; J. S. Solakian; A. Medved

[57] ABSTRACT

A method of optimizing the operation of a process so that desired products are produced at minimum cost. The process has a plurality of process components, with each component having a run status and an idle status. The process has available more than one input and produces more than one output. The process is controlled by a computer which is provided with a mathematical model of the process, which model includes a model of each of its components. The model for each process component includes a logic variable, which logic variable can have only two values, 0 and 1, and which represent the run or idle status of each process component. The computer, when predetermined conditions arise, solves a mixed integer equation to determine the optimum state of the process at a given time to produce the desired outputs, at desired rates and at minimum cost; and, in doing so, determines the value of the logic variable for each component. When a change of status of a process component from run to idle or idle to run is required to place the process in its optimum state, control signals to cause such change of status of process components are applied to such components.

17 Claims, 9 Drawing Figures

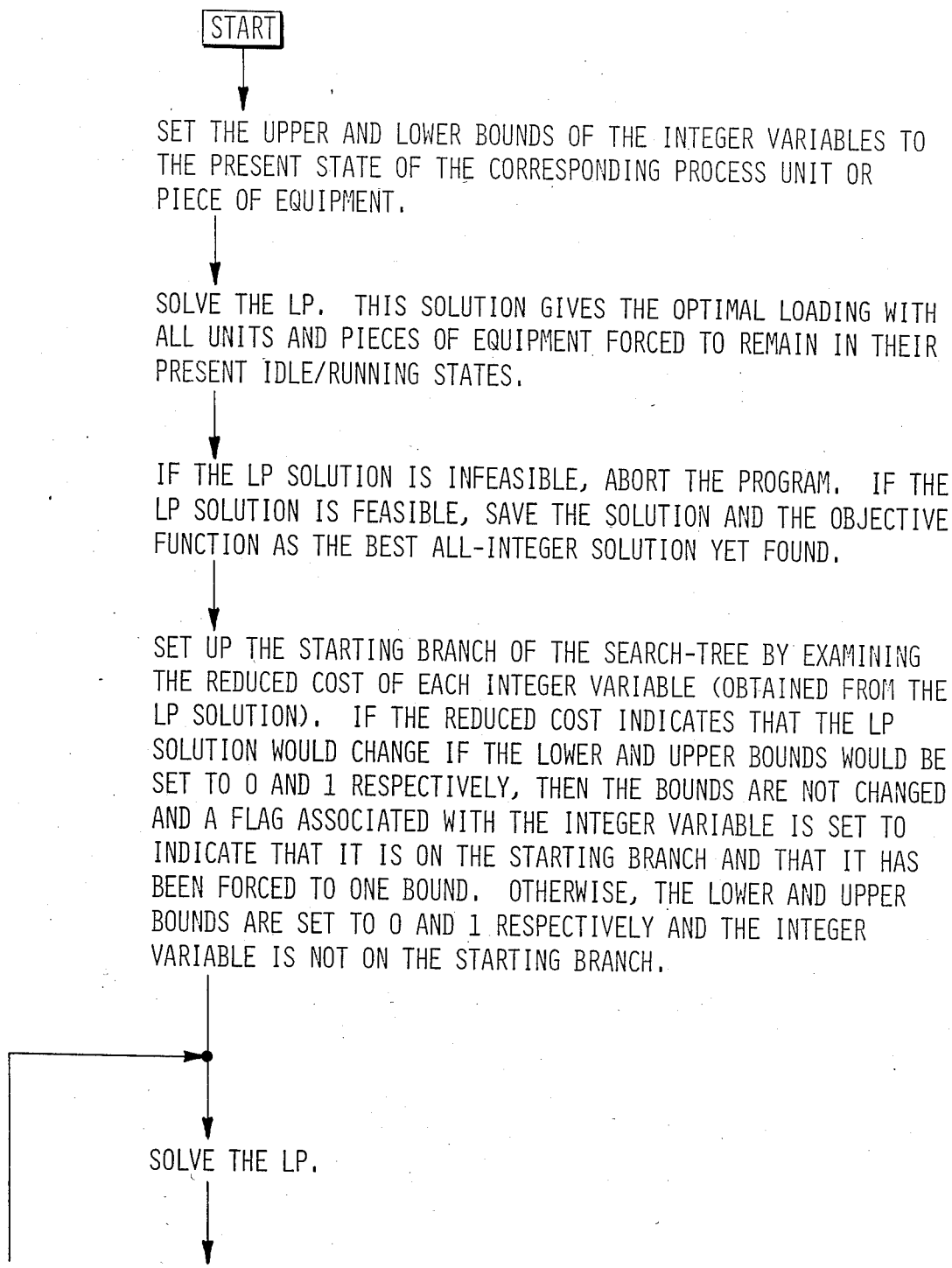
FIG. 6-A

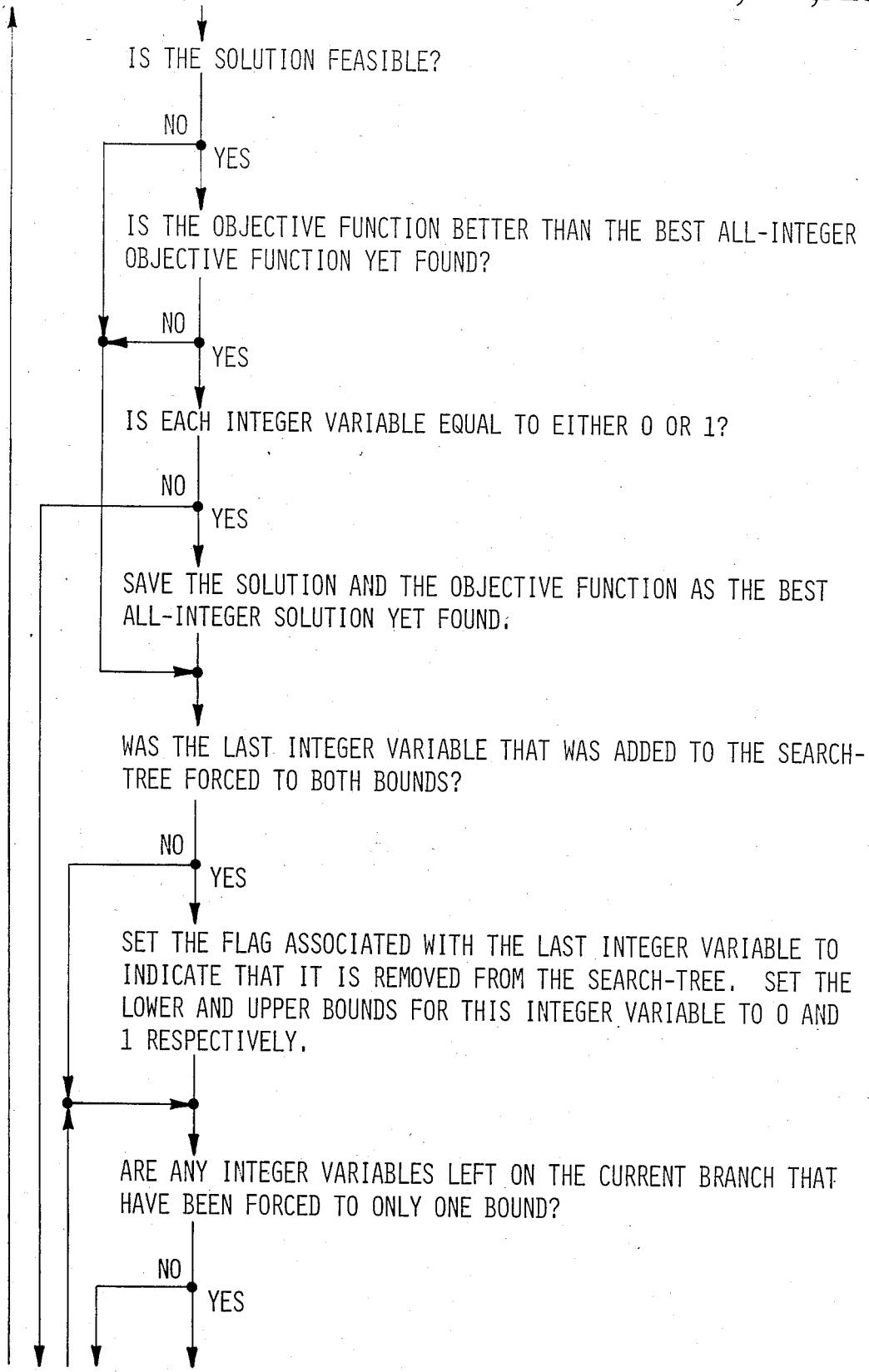
FIG. 6-B

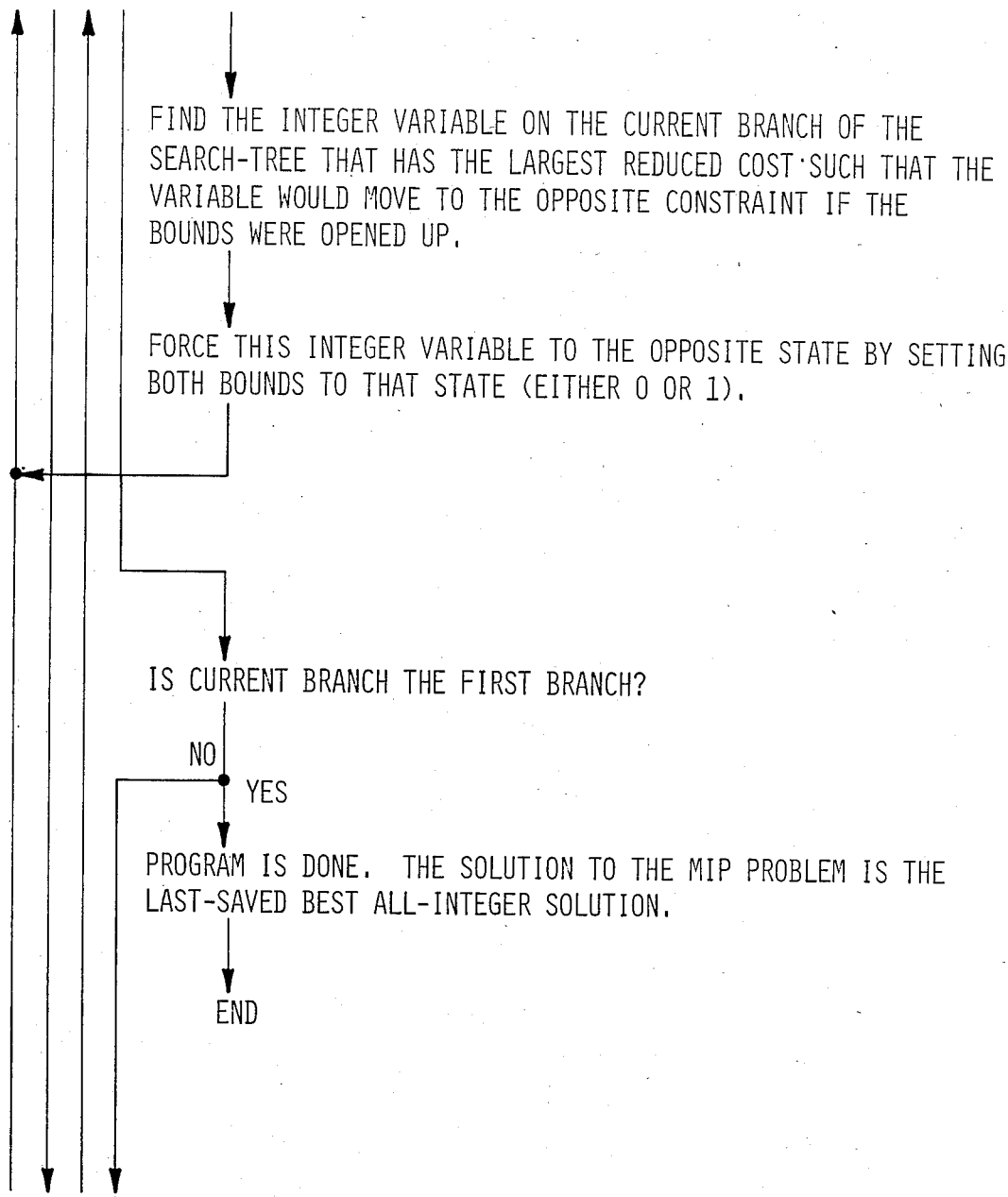
FIG. 6-C

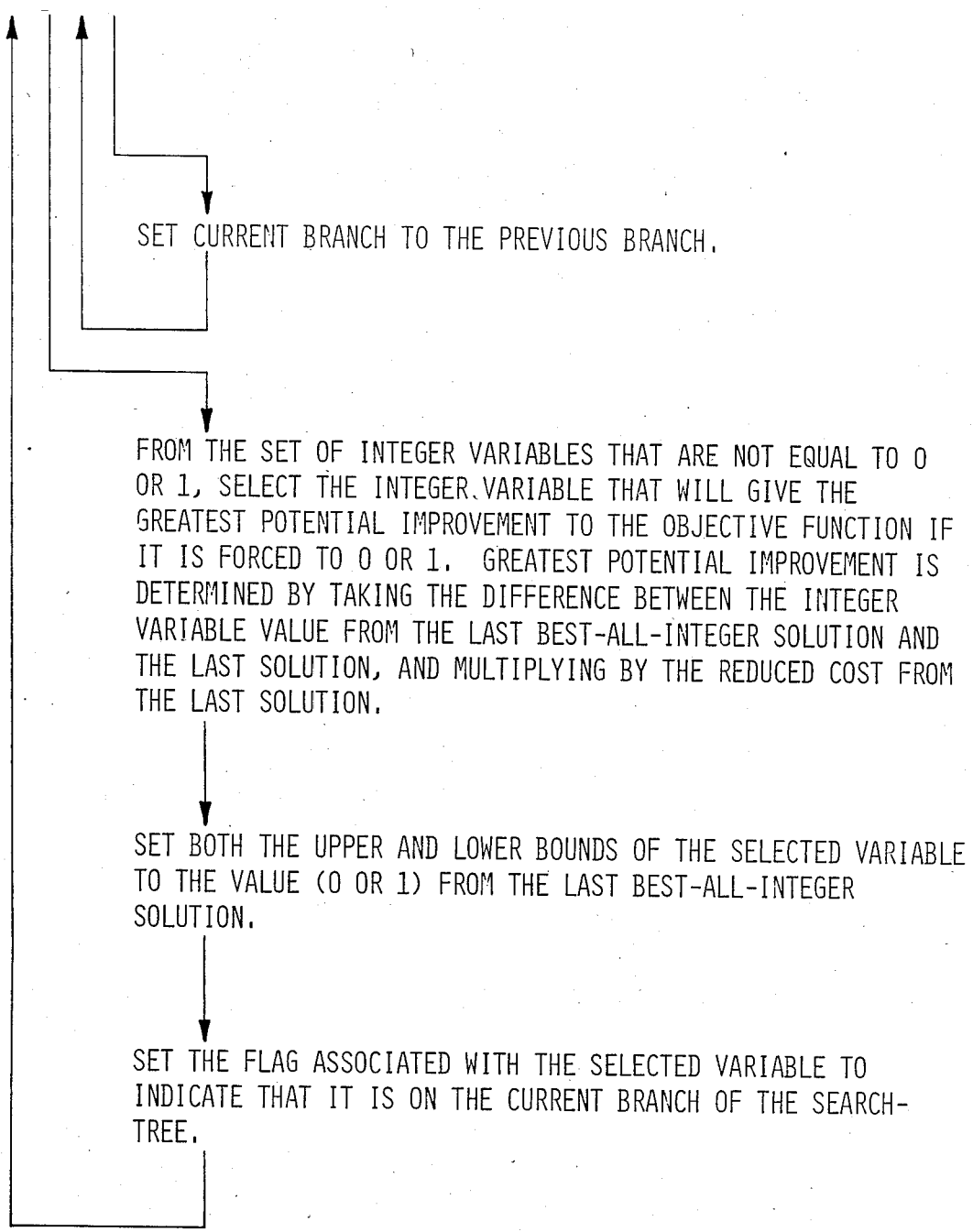
FIG. 6-D

DISCONTINUOUS OPTIMIZATION PROCEDURE MODELLING THE RUN-IDLE STATUS OF PLURAL PROCESS COMPONENTS

CROSS-REFERENCE TO RELATED APPLICATION

This application is a continuation-in-part of Application Ser. No. 313,429 filed Oct. 21, 1981 now abandoned.

BACKGROUND OF THE INVENTION

1. Field of the Invention

This invention is in the field of methods of controlling processes to produce desired products at desired rates and at minimum cost, and, more particularly, to a process controlled by a computer which substantially continuously determines the run/idle status of each of the process components to produce the optimum state of the process at a given time and controls the process to substantially operate in said optimum state.

2. Description of the Prior Art

The use of a digital computer to control complex processes of a process plant or of a portion of such a plant is well known in the process control art, including the use of computers in optimizing process operations. This, in practice, requires the computer to calculate the optimal set points, desired values for process variables, at which to run the process and/or the components of the process. In practice, the computer calculates the set points for the components of a process and/or the components thereof and then applies the set points to control loops, which can exist either in the computer or externally of the computer in individual controllers.

Processes in industrial plants are subject to disturbances which require compensating action in the form of adjustments to the operating variables, including the starting up of idle equipment or the shutting down of running equipment if the disturbance is large enough. Such disturbances can be the result of the accumulation of gradual changes over a substantial period of time. Examples of such disturbances include changes in feedstock availability or cost; fuel, steam, electrical power or other energy source availability or cost; demand or prices of products of the process; condition of processing equipment and machinery; ambient conditions; and others. Compensating operational actions include adjustments to equipment output rates; energy sources and rates; operating pressure, temperature and other process variables; feedstock types and rates; catalyst addition and removal rates; residence times; idle or running status of equipment or process units; and others. For many industrial processes, a number of different operational adjustments can be made. The effect of a given adjustment is not confined to one well-defined result, but rather produces a range of results, some larger and some smaller, throughout the process, due to the interactions of many parts of the process with each other. These can be caused by the sharing of feedstock and energy streams and product output capabilities. Other causes are the fact that the output of one part of the process is the input to another. For a large class of industrial processes, there are numerous products, each with a different value, and possibly, with a specified minimum or a maximum rate of production. There are often numerous feedstocks and energy sources, each with a different cost and possibly with a specified maximum or minimum availability. Often there are numerous alternate pieces of equipment, process components, and processing steps which may be selected, each with different operating characteristics and availability. These process characteristics make it difficult to manually keep the operating variables adjusted to maximize profit or minimize cost of operations.

On-line, closed-loop optimization of continous operating variables has been accomplished in the past, but not with the simultaneous real-time adjustment of idle and run statuses. On-line, real-time optimization techniques have been limited to continuous operating variables. In types of processes with a number of process units or components, only some of which need to be running under circumstances which prevail at least part of the time, prior art on-line, real-time techniques could not determine the optimal choice of which process component or unit should be put in a run status and which in an idle status at any particular point in time. This limitation is the result of the discontinous nature of the transition from idle to run status or vice-versa which is characteristic of most process components.

In complex industrial processes, such as that of an industrial power plant for a petro-chemical plant, for example, the plant will typically have several steam boilers for producing steam, turbines for driving electric generators to produce electrical power, feedwater pumps for the boilers, etc. The inputs to the plant will typically be several different types of fuel and electrical energy purchased from an electric utility. The output of the process to users could be steam at various pressures, electricity, compressed air, chilled water, etc. The plant produces or acquires products, utilities, for example, at rates the users of the output of the plant require.

Optimizing on a real-time basis the process of supplying the desired products, utilities in the example, to meet demands at minimum cost, particularly deciding when to change the status of process components from run to idle, or vice versa, is a function that heretofore process control computers have not been able to perform on a real-time basis.

BRIEF SUMMARY OF THE INVENTION

The present invention provides a real-time method which minimizes the cost, or maximizes the profit, of operating a process plant, or portion of the plant, by the optimal adjustment of the running versus idle status of the process components, or units, of the process. A digital computer is used in controlling the process and in determining which of the process components of the process will be placed in run or idle status. The process has a plurality of inputs and it is capable of producting a plurality of products or outputs. Necessary data such as the variables and parameters of the process are provided to the computer on a continuing basis. The computer is also provided with a mathematical description, or model, of the process, which is used in calculating the optimum values of the continuous variables and discontinuous or logic variables of the process. The computer is provided with an optimization procedure which determines the optimum state of operation of the process by calculating the value of the logic variables associated with each component which determines their status, run, or idle, for the optimum state of the process. In addition, this program uses data supplied to the computer on a continuous basis to determine the desired values for the continuous variables. Periodically, as a result of comparing the current state of operation of the process with the most recently calculated or determined optimum state produced by the optimization procedure, or after a predetermined period of time has elapsed since the previous optimum state was determined, the computer initiates the operation of the optimization procedure to produce an updated optimum state of the process which determines if any of the logic variables associated with each of the components of the process should be changed to satisfy the new or updated objective function which is descriptive of the optimum state for the process at that time. The computer then causes the statuses of the process components, run or idle, to be in accord with the latest optimum state, which includes changing the status of the process components from run to idle or idle to run as required.

It is, therefore, an object of this invention to provide an improved method of optimizing the cost of operating a process while satisfying the requirements of the process.

It is another object of this invention to provide a real-time method of determining the optimum state for each of the process components of a process to minimize the cost of supplying the demand placed upon such process.

It is another object of this invention to provide a real-time method for determining when to start a plant component of a process, or to place it in a run status and when to place it in an idle status while concurrently optimizing the continous variables of the process to satisfy the output requirements placed on the process at minimum cost.

BRIEF DESCRIPTION OF THE DRAWINGS

Other objects, features and advantages of the invention will be readily apparent from the following description of a preferred embodiment thereof taken in conjunction with the accompanying drawings, although variations and modifications may be effected without departing from the spirit and scope of the novel concepts of the disclosure, and in which:

FIGS. 6-A, 6-B, 6-C and 6-D are detailed flow charts of the Mixed Integer Program.

DETAILED DESCRIPTION OF THE INVENTION

Figure 1:
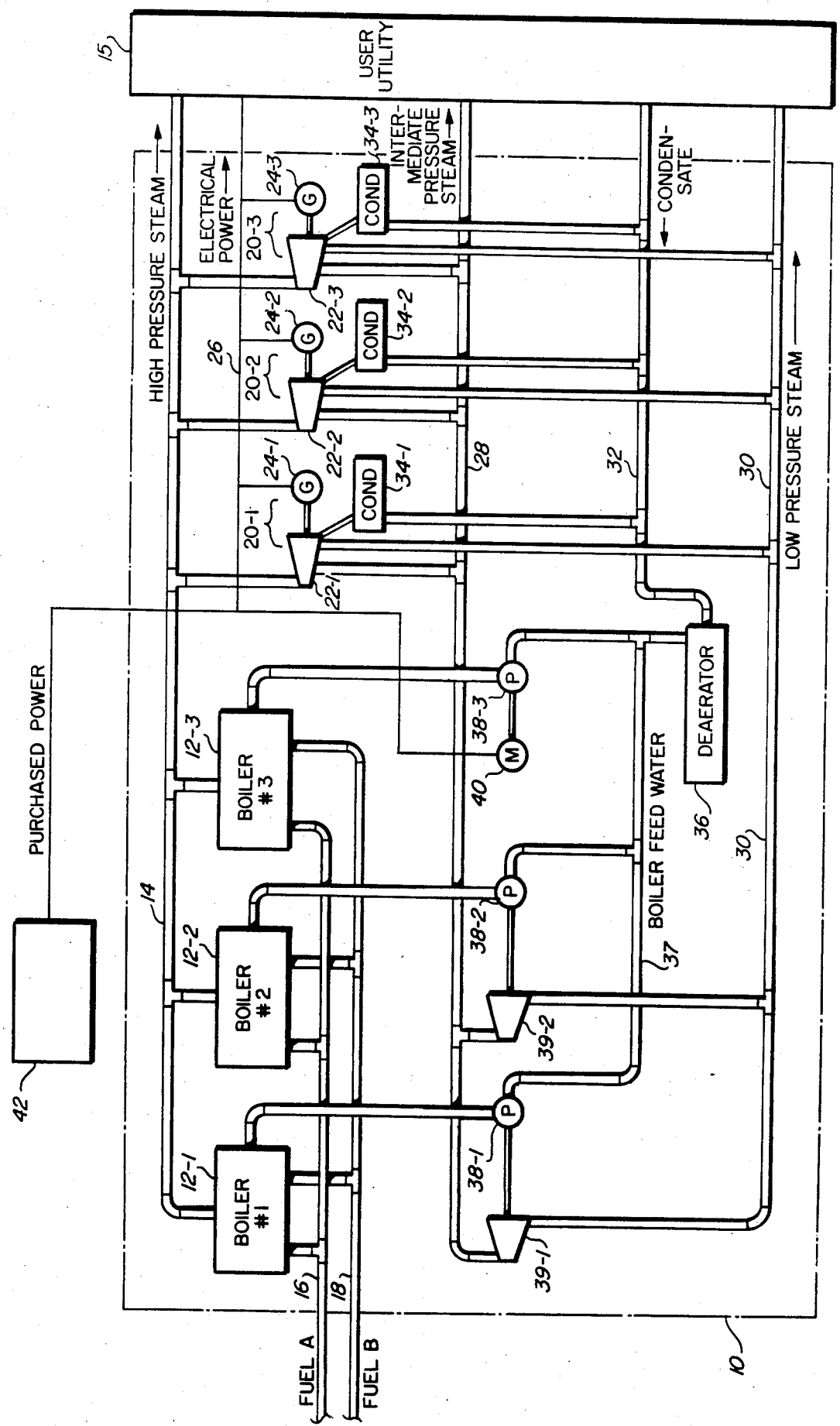
FIG. 1 is a schematic diagram of the components of a process of an industrial plant.

In FIG. 1, the process units or components of a conventional industrial power plant, or power house, 10, the operation of which is optimized by the method of this invention, are illustrated. Exemplary power plant 10 is provided with three conventional boilers 12-1, 12-2 and 12-3, each of which is capable of producing high-pressure steam. The steam produced by boilers 12-1, 12-2, and 12-3, is supplied to high-pressure steam supply line, or header, 14, and through header 14 to utility users 15 of high-pressure steam in various processes, for example. In the example illustrated in FIG. 1, each of the boilers 12-1, 12-2, and 12-3, has the capability of burning two different types of fuel, fuel A which in the preferred embodiment is coal and fuel B which may be a fuel oil of an appropriate grade. Fuel A is supplied through conduit 16, and fuel B is supplied through conduit 18 to the boilers 12-1, 12-2, and 12-3. One of the fuels is always supplied to a boiler, typically fuel A, and fuel B is added under certain circumstances.

Power plant 10 is provided with several turbogenerator sets 20-1, 20-2, and 20-3, each of which includes an extraction turbine 22-1, 22-2 and 22-3 driving an electrical generator 24-1, 24-2 and 24-3, which generators produce electrical power. The electrical power produced by generators 24-1, 24-2, and 24-3 is connected to an electrical bus or power line 26 which conveys electric power, 60 cycle in the preferred embodiment, to users 15. Turbines 22-1, 22-2, and 22-3 each has a high-pressure section, an intermediate section and a low-pressure section as is common in the steam turbine art. High-pressure header 14 also supplies high-pressure steam to the high-pressure section of each turbine 22-1, 22-2, and 22-3 through a conventional throttle valve which is not illustrated. The high-pressure section of each turbine supplies extraction steam to the intermediate steam pressure header, or line, 28. Extraction steam flowing from the intermediate pressure section of each of the turbines 22-1, 22-2, and 22-3 is supplied to low-steam pressure header 30. Exhaust steam from the lower pressure sections of each turbine 22-1, 22-2, and 22-3 is connected to a condenser 34-1, 34-2, and 34-3 and condensate from the condensers flows into condensate line 32. High, low, and intermediate headers 14, 28 and 30 supply steam to processes of utility user 15 that require substantial quantities of steam such as are frequently found in chemical plants, for example. Condensate from steam supplied to processes of users 15 flows back to plant 10 through condensate line 32. Line 32 is provided with a deaerator 36. Condensate after being deaerated by deaerator 36 is deemed to be boiler feedwater in feedwater line 37. Feedwater for boilers 12-1, 12-2, and 12-3 can be supplied by any one of the feedwater pumps 38-1, 38-2, and 38-3. Pumps 38-1 and 38-2 are powered by turbines 39-1 and 39-2. Turbines 39-1 and 39-2 are provided with intermediate pressure steam from intermediate pressure steam header 28, and steam extracted from turbines 40-1, 40-2, flows into low-pressure steam header 30.

Feedwater pump 38-3 is powered by an electric motor 40 which is supplied with electric power from distribution bus, or line, 26. Electric power from a source external to plant 10 such as an electric utility power plant 42 can be connected to bus 26 to supplement the electric power produced by turbogenerator sets 20-1, 20-2, and 20-3, or to supply all the needs for electrical power if that is the optimum way to provide electrical energy to user 15, for example. That portion of process 10 which determines the amount of electric power purchased from plant 42 is a process component of process 10.

Sensors for measuring temperature, pressure, flow rate, power produced, power purchased, fuels consumed, etc., of the process components, as well as means for controlling process 10, are not illustrated since they are conventional and well known in the process control art.

Figure 2:
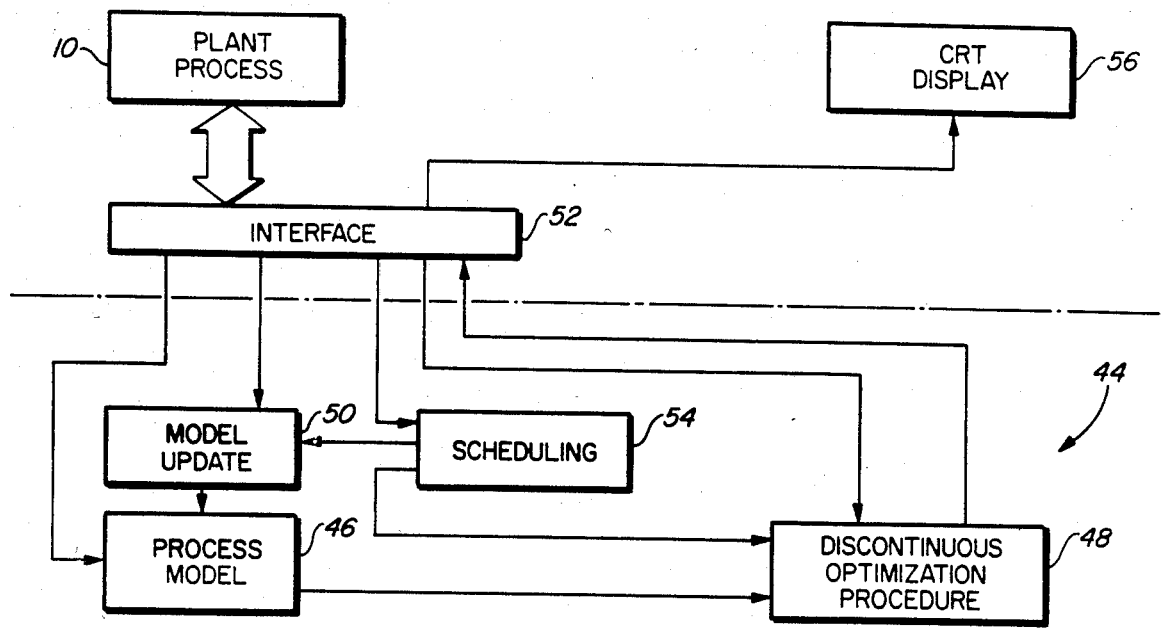
FIG. 2 is a schematic view of the method of this invention and how it inter-relates with a plant process.

To minimize the cost of operation of the process of plant 10, sometimes hereafter process 10, requires the use of a process control computer 44, such as a Honeywell TDC4500 B, a programmable digital data processing system, the major functions, or procedures, of the method reside in and are executed by computer 44 and their relationship to process 10 are illustrated in FIG. 2.

Figure 5:
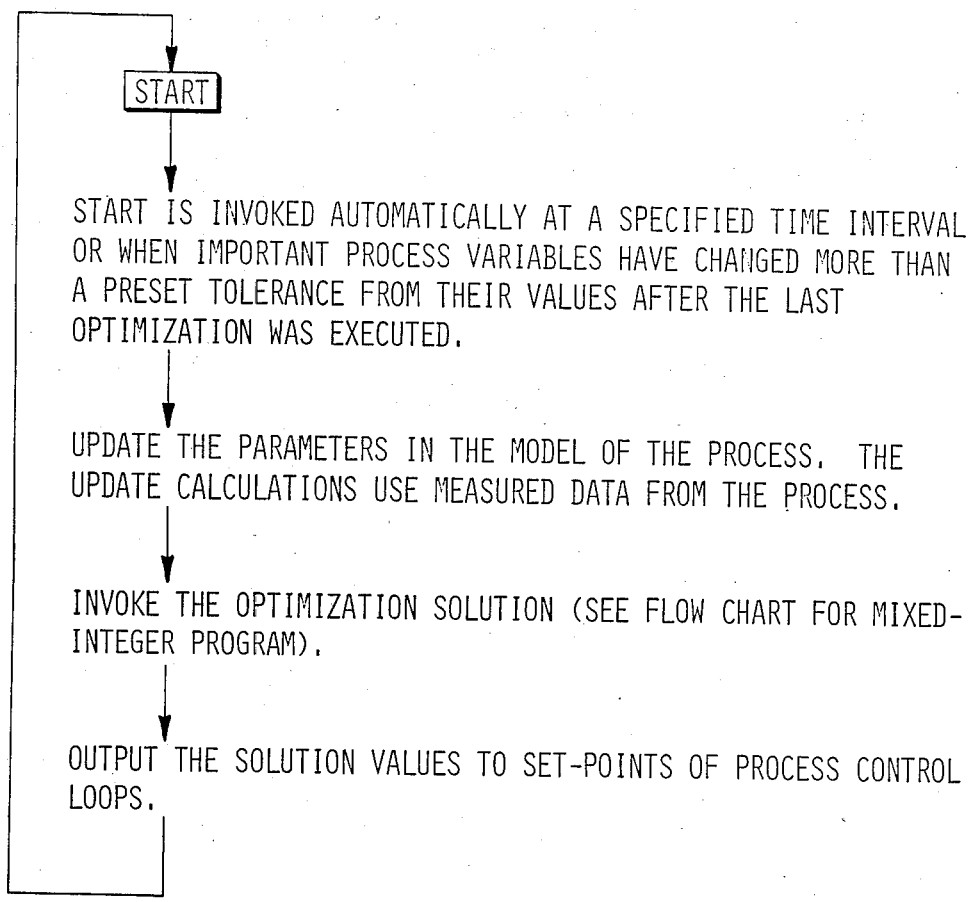
FIG. 5 is a flow chart of the process.

In FIG. 5, a high-level flow chart of process 10 is illustrated. Process model 46 is a mathematical description of the operation of process 10 which is to be optimized and includes the effects of idling or running the various process units or equipment items of process 10 by use of discontinuous logic variables as will be described below. A source listing of program 46, which is entitled MODELϕ, is found in the microfiche appendix attached hereto. Optimization procedure 48, also called the discontinuous optimization procedure since it can determine the values of the logic variables and continuous variables of the optimum state of process 10 at any given time, uses the process model in determining the optimum values of the set of logic and independent variables for each process unit of process 10. A source listing of optimization procedure 48, which includes programs MIPSOL, MODELR, OCP, MODELϕ, MODEL2, and MODELS is found in the microfiche appendix. This appendix contains 208 pages. A detailed flow chart of the Mixed-Integer Program is illustrated in FIGS. 6A-D. Process model 46 contains parameters which are assumed to be constant during a given calculation of the optimum state of the process, but which are actually slowly changing in value as a result of changes in equipment characteristics over a period of time. To compensate for such changes, model update procedure 50 updates the parameters of process model 46 before optimization procedure 48 is executed so that model 46 of process 10 is an accurate representation of the actual process. Model update procedure 50 is a function of the Optimization Initiation Program, OIP, the source listing of which is included in the microfiche appendix. Data required during the execution of various procedures are obtained from sensors on, or related to, the operation of the various process components. In the preferred embodiment, this function is provided by a Honeywell TDC2000 process control system. The signals or data from these sensors are transferred through interface 52 to computer 44. Scheduling procedure 54 causes computer 44 to monitor the state of process 10 on a continuing basis and to compare the actual state of process 10 with the optimum process state when last determined by optimization procedure 48. A source listing of scheduling procedure 54, entitled SCHEDULER, is also included in the microfiche appendix attached hereto. If there is a significant difference between the actual process state at a given time and the optimum state as last determined by optimization procedure 48, scheduling procedure 54 causes optimization procedure 48 to recalculate an optimum state of process 10 based on the most recently available data. Such a recalculation of the optimum state with also occur after a predetermined period of time has elapsed since the last calculation, or upon the demand of the operator of plant 10. The process model can be described mathematically as follows:

$$Z = F(X_1, X_2, \ldots, X_n, I_1, I_2, \ldots, I_k)$$

$$Y_{1L} \leq Y_1(X_1, X_2, \ldots, X_n, I_1, I_2, \ldots, I_k) \leq Y_{1U}$$

$$Y_{2L} \leq Y_2(X_1, X_2, \ldots, X_n, I_1, I_2, \ldots, I_k) \leq Y_{2U}$$

$$\vdots$$

$$Y_{mL} \leq Y_m(X_1, X_2, \ldots, X_n, I_1, I_2, \ldots, I_k) \leq Y_{mU}$$

-continued $$X_{1L} \leq X_1 \leq X_{1U}$$

$$X_{2L} \leq X_2 \leq X_{2U}$$

$$\vdots$$

$$X_{nL} \leq X_n \leq X_{nU}$$

where $X_j$ are the continuous independent variables, which are related to (or are) the continuous operating adjustments of the process;

$I_k$ are the discontinuous or integer independent variables, which for purposes of this invention represent the idle or running status of the process units or equipment items;

Z is a function of the $X_j$ and $I_k$, termed the objective function, which represents the cost or profit of operating the process, to be minimized or maximized respectively;

$Y_i$ are functions of the $X_j$ and $I_k$, termed the dependent variables, which represent quantities which are subject to constraints;

$Y_{iL}$ and $Y_{iU}$ are the lower and upper bound values which constrain $Y_i$; and $X_{iL}$ and $X_i$ are the lower and upper bound values which constrain X.

The above equations generally represent a process model and in the preferred embodiment are linear equations so that the model is a linear model of process 10. A linear model is one in which no independent variable occurs in the model which is multiplied by another independent variable or itself. A linear model is used since it normally can be solved by a linear model program in a shorter period of time than a non-linear model; however, non-linear models can be used equally well if the time for calculating a solution is not a problem.

The integer independent or discontinuous variables, also termed integer variables and logic variables, are treated specially by the discontinuous optimization procedure 48 so that each logic variable may have only the values zero or one in a solution. Since each process component of process 10 by definition, has a run status and an idle status, each process component has an associated logic variable, with the value zero representing its idle status and the value one representing its running status. The equations for each of the process components are formulated so that the no-load input value and the minimum output value, if other than zero, multiply the logic variable. A special constraint is introduced to force the output value, and therefore the input value, to zero when the logic variable is zero.

For process 10, the method of this invention determines which of the boilers, turbines and feedwater pumps should be idle and which should be running, the steam production rate for each running boiler, the relative rates at which the two fuels are to be supplied to each boiler, the power generated on each running turbogenerator, each turbogenerator extraction steam flow rate, the amount of purchased power, and the feedwater flow rate of each running pump whether powered by steam or electricity, so that the present demands by utility user 15 for electric power and steam are met, for example, while the total cost of the purchased power and fuels is minimized.

Figure 3:
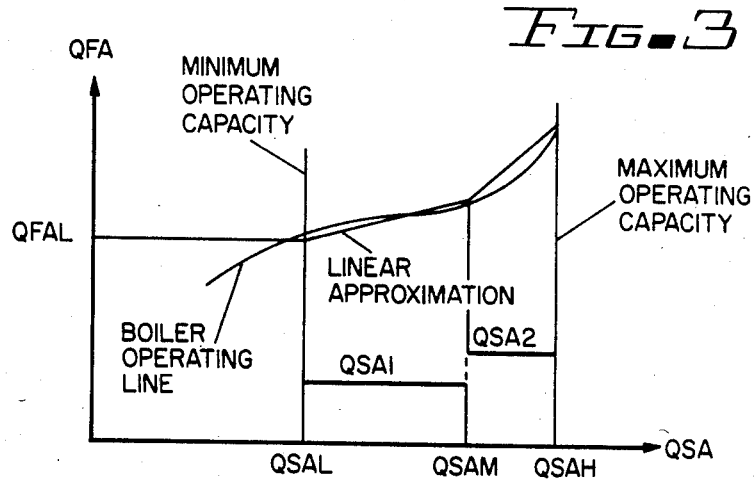
FIG. 3 is a graph of a boiler model.

In FIG. 3, there is illustrated a graph of linear equations which describe the operation of one of the boilers 12-1, 2, 3, etc., use fuel A. A graph of the linear equations describing the operation with fuel B is not illustrated because it is assumed that the boiler is always fired with fuel A, and fuel B is an incremental fuel whose fuel versus steam curve passes through the origin. For this reason, a graph for fuel B is not illustrated. The model for one of the boilers using fuel A as the base fuel and fuel B as the incremental fuel B is as set forth below:

$QFA = QFAL*I + AA1*QSA1 + AA2*QSA2$
$QFB = AB*QSB$
$QS = QSAL*I + QSA1 + QSA2 + QSB$
$QSRM = QSAH*I - QS$
$0 \leq QSA1 \leq QSAM - QSAL$
$0 \leq QSA2 \leq QSAH - QSAM$
$0 \leq QSB$
$0 \leq QSRM$
$0 \leq QFA \leq QFAH$
$0 \leq QFB \leq QFBH$ In the foregoing an (*) represents the mathematical "multiply" function.

NOMENCLATURE

QS Total rate of heat pickup by steam and blowdown
QSA Rate of heat pickup from fuel A
QSB Independent variable. Rate of heat pickup from fuel B
QSAL QSA at minimum firing rate of fuel A
QSAH QSA at maximum firing rate of fuel A
QSAM QSA at breakpoint of two line segments which approximate curve of QFA versus QSA
QSA1 Independent variable. QSA on first line segment (QSA above QSAL)
QSA2 Independent variable. QSA on second line segment (QSA above QSAM)
QFA Rate of heat release from fuel A
QFB Rate of heat release from fuel B
QFAL QFA at minimum firing rate of fuel A
QFAH QFA at maximum firing rate of fuel A
QFBH QFB at maximum firing rate of fuel B
I Integer independent variable representing idle or running state of the boiler
AA1 Slope of fuel A versus steam from fuel A on first line segment
AA2 Slope of fuel A versus steam from fuel A on second line segment
AB Slope of fuel B versus steam from fuel B The boiler used in this example is supplied with two types of fuel, fuel A and fuel B. Fuel A, which in the preferred embodiment is coal, is always being supplied or fired; it is the base fuel. Fuel B, which may be a fuel oil, may be optionally fired. It is assumed that fuel A alone can produce steam at the maximum rate for each of the boilers; thus, QSAH is a maximum total steam as well as the maximum steam from fuel A. Because fuel A is always fired, it is considered to provide the constant boiler heat losses. Fuel B is therefore represented as an incremental fuel whose fuel-versus-steam curve passes through the origin. Other formulations are possible for different types of fuel firing schedules. Similar models can be developed for each of the operating components, as is well known in the process control art using well-known linear programming techniques, and the program entitled MODELR, the source listing of which is found in the microfiche appendix, is such a model. It should be noted that the mathematical model for a boiler as illustrated in FIG. 3 is discontinuous between the vertical line identified as "Minimum Operating Capacity" and the origin of the graph where the transition from idle to run status or vice-versa occurs. Mathematical models for other components, such as steam turbines, also have discontinuities between their run status, or state, and their idle status, or state.

Optimization procedure 48 takes into account in determining the optimum state for process 10 the cost of starting up or shutting down a process unit. This is accomplished by including each logic variable in the objective function, with each logic variable being multiplied by an idle/run cost coefficient for the process component associated with that logic variable. Prior to beginning the execution of the optimization procedure 48, the sign of the idle/run cost coefficient is set by the model update function so that a cost is incurred if the idle/run status is changed from its presently existing status. Thus, the objective function is expressed in terms of cost to be minimized. The following table gives the sign that is placed on the coefficient:

| Present Status | Coefficient Value |
| --- | --- |
| Idle | +/value/ |
| Running | −/value/ |

The foregoing has the effect of always increasing cost from the present cost if the status of any logic variable changes from zero to one on start-up or from one to zero on shutdown. Cost is increased by the amount of the coefficient. Large coefficients therefore prevent the optimization from changing the statuses of process components unless savings greater than costs associated with changing the status can be realized by doing so.

Figure 4:
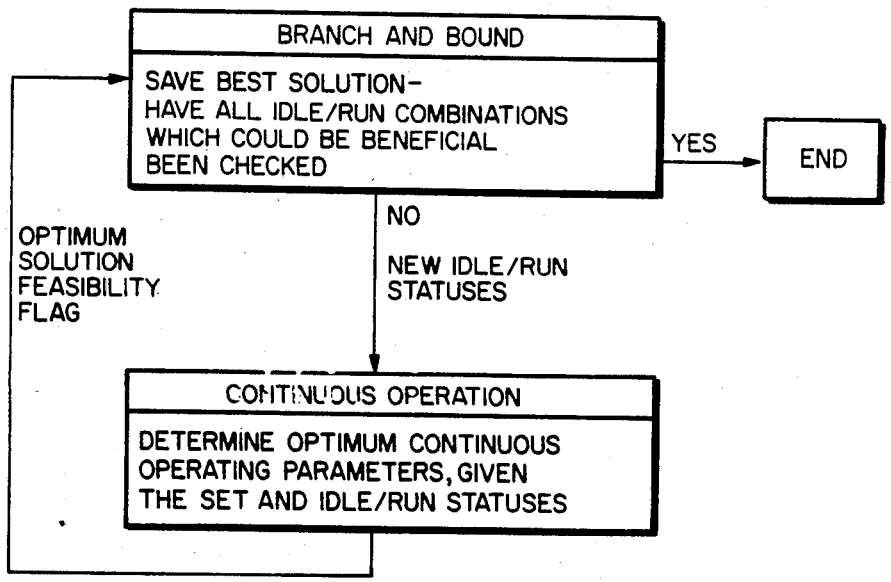
FIG. 4 is a flow chart of the discontinuous optimization procedure.

The invention utilizes an augmented simplex procedure to determine the optimum solution, or state, for the continuous process model; i.e., with some combination of idle and run choices being made for each integer variable. A branch-and-bound technique is used to choose the different combinations of idle and run choices, each of which is solved by the simplex method. The flow chart of FIG. 4 is illustrative of this procedure, which is more thoroughly described in an article entitled "How to Use Mixed-Integer Programming" by Derek H. Allen in *Chemical Engineering*, Mar. 29, 1976, pages 114–120.

Values of the logic variables, independent variables, parameters, etc., of the most recently updated optimum state for process 10 as a result of the execution of optimization procedure 48 are used to control process 10 and its process components by control signals transmitted from process control computer 44 through interface 52 to adjust the set points of the controls of process 10 to correspond to the optimum state. Any signals representing useful information concerning process 10 can also be displayed on conventional CRT console 56. Such displays permit an operator to monitor the process and to be aware of the idle/run status of each of the process components as determined by the process control computer in placing the process in its optimum state.

The continual calculation of an optimum state of the process taking into consideration the cost associated with turning on or turning off of process components significantly reduces the cost of operating process 10.

Source listings of the following programs are found in the attached microfiche appendix:

1. SCHEDULER: Causes optimization procedure to recalculate an optimum state of the process based on the most recently available data.
2. OIP: Optimization Initiation Program. First program that is scheduled for a particular optimization solution. Inputs all required data from the real-time data base. Sets up bounds for the optimization based on present statuses of control loops to which the optimal values will be output. Updates parameters in the optimization model, using present measurements from the process, so that the model is an accurate representation of the process. Initiates MIPEX.
3. MIPEX: Mixed-Integer Program Executive. Controls execution of MIPSOL; queues solution requests if MIPSOL is busy.
4. MIPSOL: Mixed-Integer Program Solution. Does the actual solution of the mixed-integer model to determine the optimum idle/run states and loadings.
5. MODELR: Real-time program that includes the model of the process(es) to be optimized. Executed by MIPSOL to obtain the relationships needed for the optimization.
6. OCP: Optimization Completion Program. Last program that is scheduled for a particular optimization solution. Initiated by MIPEX when solution is complete. Gets the data from the optimization solution into a form suitable for direct output to control loops to move the process(es) to the calculated optimum, and outputs the data to the control loops.
7. MODEL$\phi$: Actual model of the process(es). Calculates values of the constraints and the objective function, given values of the independent variables. Subroutine used by MODELR and OCP.
8. MODEL2: Calculates numerical approximations to the gradient matrix of the partial derivative of the constraints and objective function with respect to the independent variables, for the model contained in MODEL$\phi$. Subroutine used by MODELR.
9. MODELS: Calculates the reduced-costs (sometimes referred to as shadow prices) for important process variables that are not inclued directly in the model. This information can be used by operating personnel to evaluate potential benefits of making changes to streams that cross the boundaries of the optimization model. Subroutine contained in OCP.

From the foregoing, it is believed obvious that this invention provides an improved method of optimizing the operation of a process to minimize cost while providing products, utilities in the preferred embodiment, which meet the requirements of the users of the products of such process by continually determining, using a mixed integer optimization procedure, when to change the operating status of components of the process while considering the costs associated with each such change of status.

It should be evident that various modifications can be made to the described method without departing from the scope of the present invention.

What is claimed is:

1. A method of operating a process with the aid of a digital computer to minimize the cost of producing desired outputs of the processor, said process having a plurality of process components with each component having a mathematical model, at least some of said mathematical models being discontinuous, said process components being capable of being placed in a run or idle status, said process being capable of having applied to it one or more inputs and capable of producing one or more outputs, comprising the steps of:

constantly providing said computer with data concerning the status of operation of each component, each output and each input of the process;

providing the computer with a mathematical model of the process which includes mathematical models of each component;

providing the computer with a real time discontinuous optimization procedure for producing an optimum state of operation of the process, said discontinuous optimization procedure determining the run or idle status of each component to minimize cost of the process;

providing the computer with a procedure to update the model;

providing the computer with a scheduling procedure; said scheduling procedure substantially continuously monitoring the state of operation of the process, comparing the current state of operation of the process with the last optimum state produced by the optimization procedure; said scheduling procedure initiating the operation of the optimization procedure to produce an updated optimum state if the current state of the process and the most recently calculated optimum state differ significantly or after the passage of a predetermined period of time; and said scheduling procedure changing the status of process components from run to idle or idle to run to be in accord with the updated optimum state of the process, as well as optimizing the operation of each process component to produce the desired outputs at minimum cost.

2. The method of claim 1 in which the discontinuous optimization procedure solves a mixed integer linear program with a logic variable for each process component.

3. The method of claim 2 in which the mathematical model is a set of linear equations.

4. The method of claim 3 in which the discontinuous optimization procedure includes a cost factor associated with a change of status of each component from run to idle and from idle to run.

5. A method of operating with the aid of a digital computer a process having a plurality of process components with each component capable of being placed in a run status or idle status, each of said process components having a mathematical model, the mathematical model of at least one of the components having a discontinuity between its run status and its idle status, said process being capable of having applied to it a plurality of inputs and capable of producing a plurality of products, comprising:

constantly providing said computer with data concerning the status and operation of each component, of each product and of each input to the process; providing the computer with a mathematical model of the process, such model including logic variable parameters, and continuous variables and parameters, for each process component;

providing the component with a discontinuous real time optimization procedure for producing the values for the logic variable of each process component and for the operation of each process component to produce an optimum state of operation of the process at minimum cost at a given time;

providing the computer with a procedure to update the parameters of the model;

providing the computer with a scheduling procedure, said scheduling procedure monitoring the state of operation of the process, comparing the current state of operation of the process with the optimum state at said given time as produced by the optimization procedure; said scheduling procedure initiating the operation of the optimization procedure to produce an updated optimum state if the current state and the optimum state differ significantly or after the passage of a predetermined period of time; and said optimization procedure producing an updated optimum state and adjusting the process to bring it into substantial accord with the updated optimum state as calculated by the optimization procedure, including changing the status of process components from run to idle or idle to run, as well as optimizing the operation of each process component to produce the desired outputs at desired rates at minimum cost.

6. The method of claim 5 in which the discontinuous optimization procedure solves a set of mixed integer linear equations.

7. The method of claim 6 in which the discontinuous optimization procedure also produces values for the independent variables of the mixed integer linear equations of the process.

8. The method of claim 7 in which the discontinuous optimization procedure includes a cost factor associated with a change of status of each component from run to idle or from idle to run.

9. A method of operating with the aid of a digital computer a utility plant having a plurality of components with each component capable of being placed in a run status or idle status, each component having a mathematical model, the mathematical model of a component of the utility plant being discontinuous between its respective run state and idle state, said plant being capable of having applied to it a plurality of energy inputs and capable of producing a plurality of energy outputs, comprising the steps of:

constantly providing said computer with data concerning the status and operation of each component, each product of and each input of the plant;

providing the computer with a mathematical model of the plant, such model including logic variables, continuous variables and parameters for each component;

providing the computer with a real time discontinuous optimization procedure for producing the values for the logic variables and continuous variables to produce an optimum state of operation of the plant at a given time;

providing the computer with a procedure to update the parameters of the model;

providing the computer with a scheduling procedure, said scheduling procedure monitoring the state of operation of the plant, comparing the current state of operation of the plant with the optimum state at said given time as produced by the optimization procedure and initiating the operation of the optimization procedure if the current state and the optimum state differ significantly or after the passage of a predetermined period of time; and said optimization procedure, when initialized, producing an updated optimum state for the process and adjusting the operation of the plant to bring it into substantial accord with the updated optimum state as determined by the optimization procedure, including changing the status of the process components from run to idle or idle to run, as well as optimizing the operation of each process component to produce the desired outputs at desired rates at minimum cost.

10. The method of claim 9 in which outputs of the plant include electrical power and steam.

11. The method of claim 10 in which the steam is produced at a plurality of differing pressures.

12. The method of claim 11 in which the inputs include at least two fuels and electrical power from a utility.

13. The method of claim 12 in which the plant includes a plurality of turbogenerator sets for producing electric power.

14. The method of claim 13 in which the discontinuous procedure solves a set of mixed integer linear equations to determine the optimum state of the plant at any given time.

15. The method of claim 14 in which the discontinuous optimization procedure also produces values for the continuous variables of the mixed integer linear equation.

16. The method of claim 15 in which the discontinuous optimization procedure includes a cost factor associated with a change of status of each plant component from run to idle or from idle to run.

17. The method of claim 16 in which one of the components of the plant is a boiler, the mathematical model of which is discontinuous between its run and idle states.

* * * * *